United States Patent [19]
Binzer

[11] Patent Number: 5,334,092
[45] Date of Patent: Aug. 2, 1994

[54] DUCT SEALING APPARATUS AND DUCTING SYSTEM

[76] Inventor: Lothar Binzer, 5721 124th St., Surry, Canada

[21] Appl. No.: 940,071

[22] Filed: Sep. 3, 1992

[51] Int. Cl.$^5$ .............................................. F23J 11/00
[52] U.S. Cl. .................... 454/369; 126/287.5
[58] Field of Search .............. 126/287.5; 137/72; 454/1, 28, 257, 357, 363, 364

[56] References Cited

U.S. PATENT DOCUMENTS

| | | | |
|---|---|---|---|
| 314,121 | 3/1885 | Gilman | 126/287.5 |
| 1,100,003 | 6/1914 | Watson | 454/369 X |
| 2,242,738 | 5/1941 | Alton | 454/369 X |
| 3,260,018 | 7/1966 | Schuh | 454/369 X |
| 4,858,517 | 8/1989 | Coker | 126/287.5 X |

FOREIGN PATENT DOCUMENTS

| | | | |
|---|---|---|---|
| 2262541 | 6/1974 | Fed. Rep. of Germany | 454/369 |
| 166251 | 7/1987 | Japan | 454/369 |
| 635256 | 4/1950 | United Kingdom | 454/257 |

Primary Examiner—Harold Joyce
Attorney, Agent, or Firm—Flehr, Hohbach, Test, Albritton & Herbert

[57] ABSTRACT

Apparatus for sealing a duct comprises an enclosed body having inlet and outlet passages communicating with the duct. A duct sealing member is located within the enclosed body and is movable between an open position to permit flow through the enclosed body and a closed position to block one of the passages of the enclosed body to prevent flow through the body. An actuating system moves the duct sealing member from the open position to the closed position. A sensing system for detecting a pre-determined condition such as excessive heat is provided to activate the actuating system and seal the duct. A ducting system incorporates the sealing apparatus and permits ventilation of heating appliances in apartment dwellings and the like in a significantly reduced area leading to material cost savings.

18 Claims, 4 Drawing Sheets

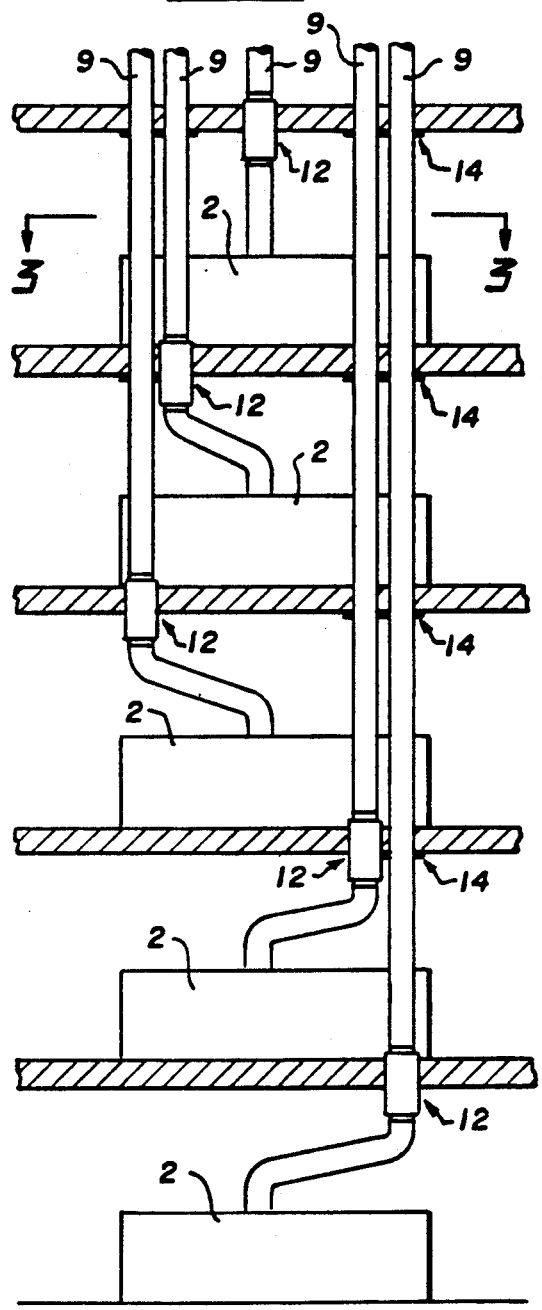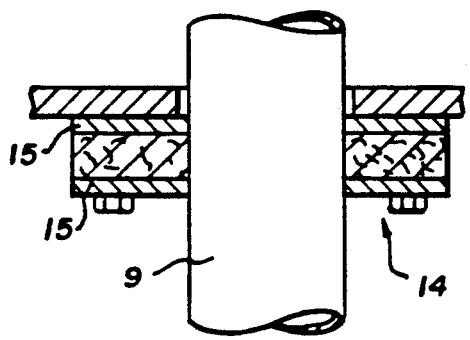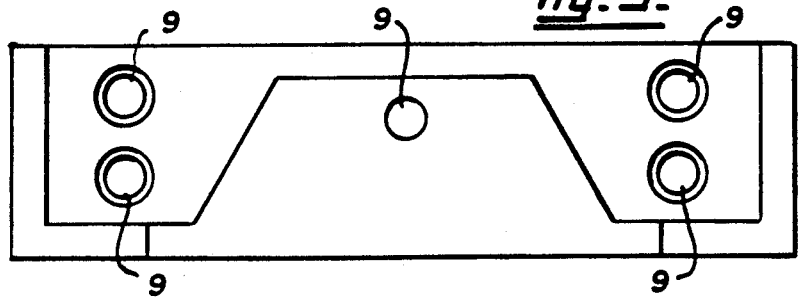

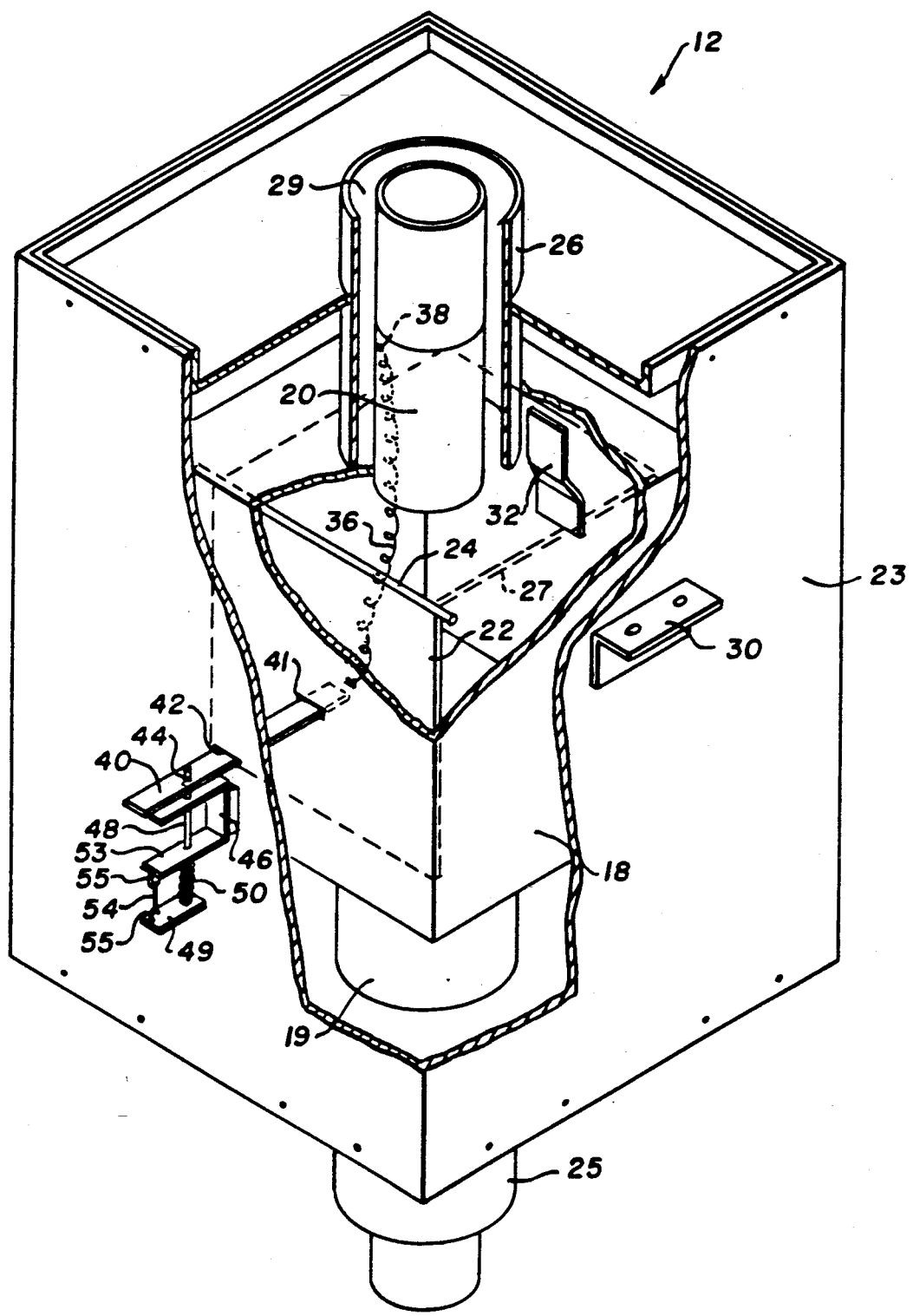

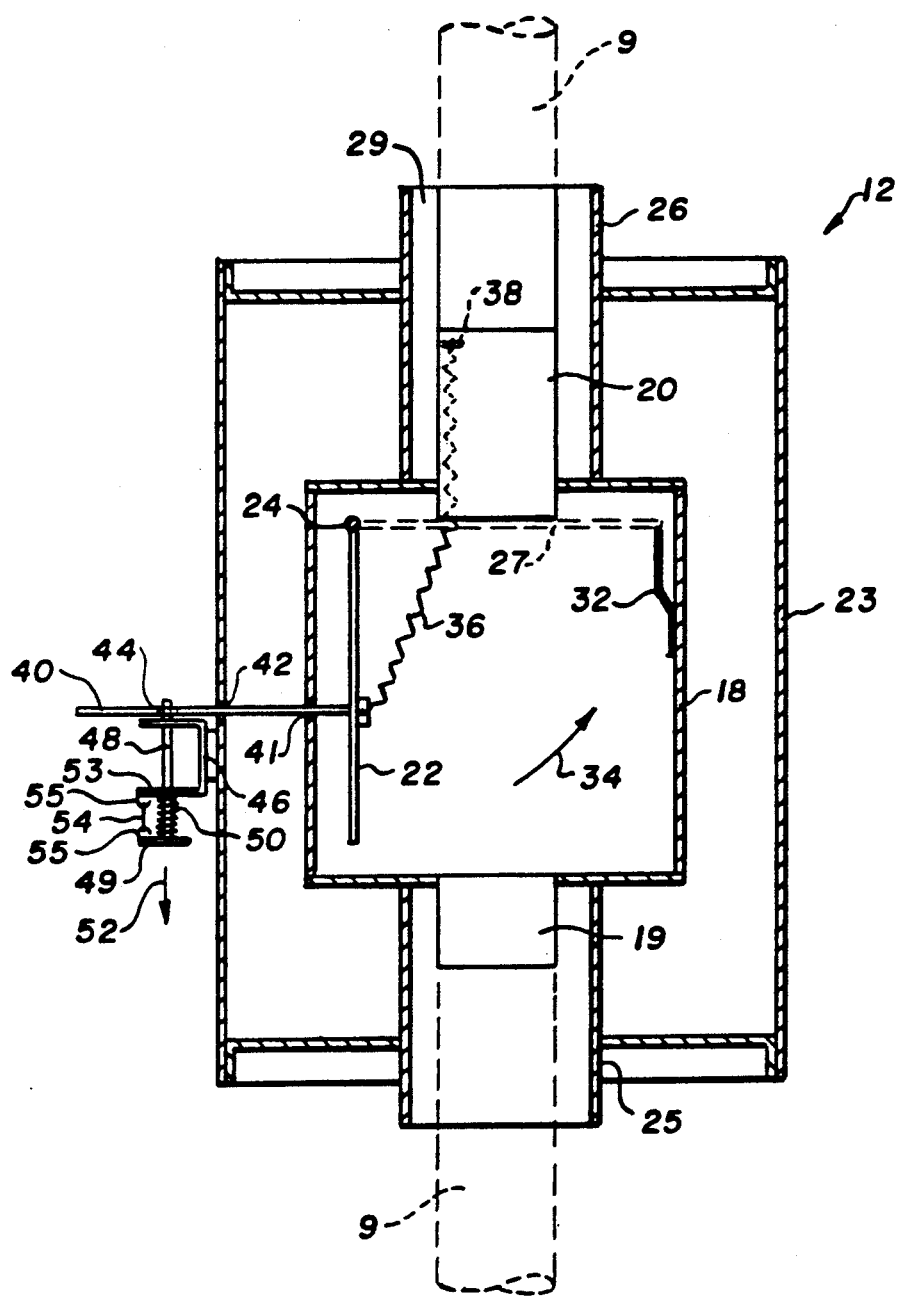

DUCT SEALING APPARATUS AND DUCTING SYSTEM

FIELD OF THE INVENTION

This invention relates to a duct sealing apparatus and ducting system.

BACKGROUND OF THE INVENTION

Ducting systems are necessary for ensuring adequate ventilation of living areas in dwellings and the like. Ventilation of heating appliances such as conventional and gas fireplaces is particularly important and fire codes have been developed that set out stringent guidelines for ensuring safe construction practices that limit the spread of fires particularly in structures such as apartment buildings where there are many heating appliances and associated ducting systems spread throughout the building. These ducting systems extend through multiple apartments and provide a potential pathway for the spread of fire.

Unfortunately, current building practices and ventilation systems that have been developed to satisfy fire codes use a great deal of building materials and are very labour intensive. The ducting systems and their associated housing structures also tend to be bulky and consume valuable living space in the apartment.

SUMMARY OF THE INVENTION

The present invention addresses these problems by providing a novel duct sealing apparatus that permits a new and much more compact ducting system to be installed in apartment dwellings to handle ventilation of heating appliances. The apparatus ensures that the ducting system for an individual apartment is sealed in the event of an adverse condition such as excessive temperature indicative of a fire. This will prevent spreading of the fire through the ducting system to other apartments.

Accordingly, the present invention provides apparatus for sealing a duct comprising:

an enclosed body having inlet and outlet passages communicating with the duct;

duct sealing means located within the enclosed body and movable between an open position to permit flow through the enclosed body and a closed position to block one of the passages of the enclosed body to prevent flow through the body;

actuating means for moving the duct sealing means from the open position to the closed position; and sensing means for detecting a pre-determined condition and activating the actuating means.

The present invention also provides a ducting system that incorporates the apparatus for sealing a duct.

BRIEF DESCRIPTION OF THE DRAWINGS

Aspects of the present invention are illustrated, merely by way of example, in the accompanying drawings in which:

FIG. 2 is a schematic elevation section view showing the ducting system incorporating the duct sealing apparatus of the present invention;

FIG. 3 is a section view taken along line 3—3 of FIG. 2;

FIG. 4 is a detail elevation view of the floor sealing system used with present invention;

FIG. 5 shows the duct sealing apparatus of the present invention in detail with broken away sections to show interior detail; and FIG. 6 is a section view through the duct sealing apparatus.

DESCRIPTION OF THE PREFERRED EMBODIMENTS

Figure 1:
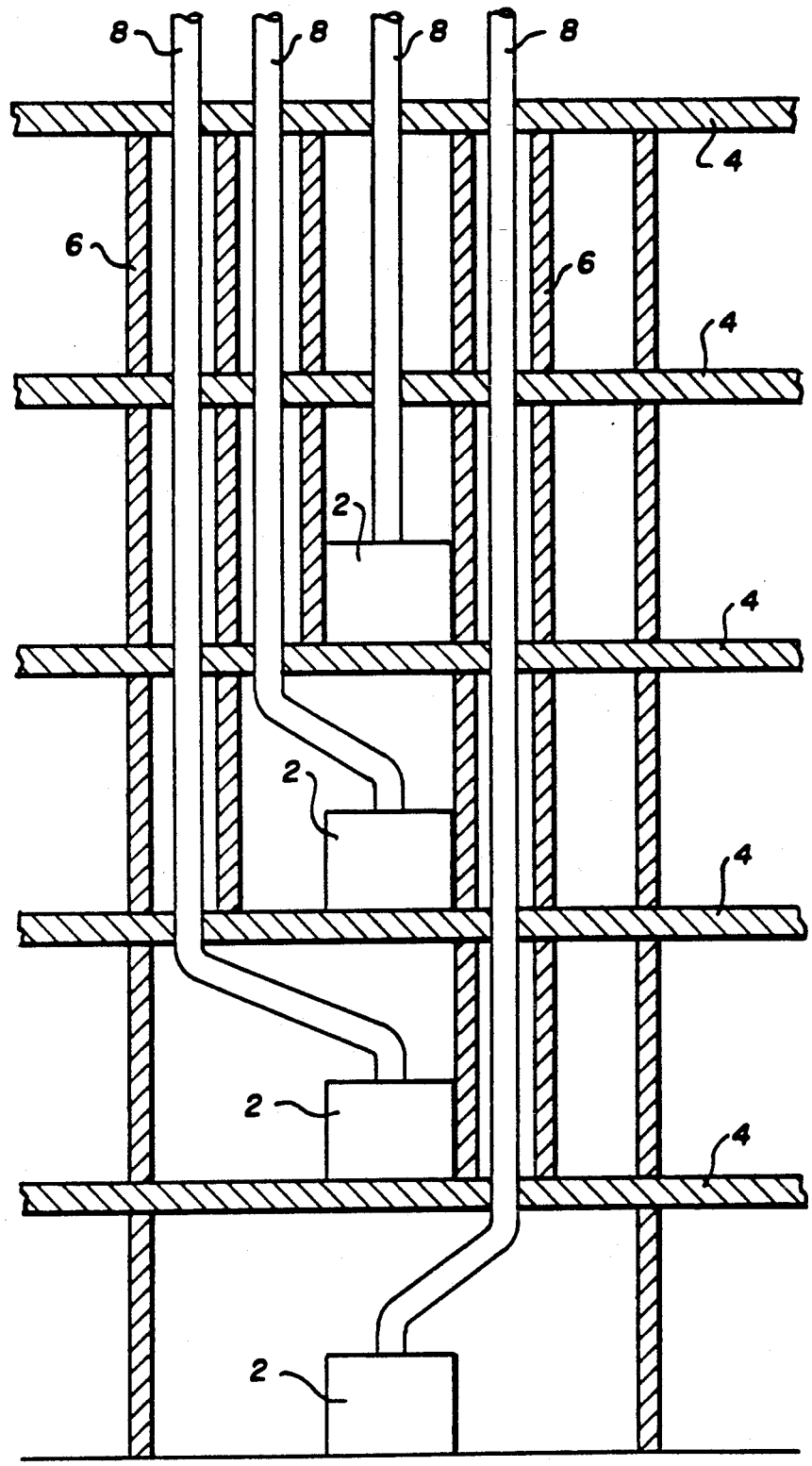
FIG. 1 is a schematic elevation section view showing a prior art heating appliance ducting system for a series of living spaces.

FIG. 1 shows an example of a ducting system that is common in North America for ventilating heating appliances such as fireplaces 2 on multiple floor levels 4. Each apartment's heating appliance has its own vent chase 6. This chase acts to confine fire escaping from the burning apartment within the chase and vent the fire to the atmosphere above the building. The chase 6 contains only a single ducting pipe 8 for the apartment otherwise if the chase were to accommodate multiple ducting pipes the intense heat of a fire could cause failure of adjacent ducting pipes and permit the spread of the fire to other apartments above the burning apartment. In general, ducting pipes used in these systems are known by the designation "B vent". The vent chases are constructed from wood 2×4's nailed together to create a column defining the walls of the vent chase.

As can be seen in FIG. 1, this prior art arrangement leads to a great deal of space being set aside to accommodate the ducting system when installing heating appliances 2 on the various floors 4 of a multi-story building. Each fireplace ducting pipe 8 is provided with its own vent chase 6 to exhaust at the roof of the building and the consumption of space increases with each additional floor level built. The ducting pipes and vent chase system are sufficiently wide that they extend into the living space of the apartments and encroach on floor space. The ducting and vent chase structures that extend into the floor space are concealed by a fireplace facade and mantlepiece and it is not unusual for the sake of aesthetics for each apartment to have a similarly sized fireplace and mantle. For lower floors this means that a great deal of the fireplace facade is wasted space that contains no actual ducting pipe.

The present invention provides a duct sealing apparatus and ducting system that addresses the problems of the prior art with respect to excess material and excess living space occupied. A heating appliance ventilating system should provide adequate ventilation during normal use and contain or isolate a fire occurring in any apartment to prevent the spread to subsequent upper floors. The ducting system of the present invention illustrated schematically in FIG. 2 provides these features. Each fireplace 2 is connected to a ducting pipe 9 that extends upwardly through upper floors 4 of an apartment building to exhaust to the atmosphere. Unlike in the prior art ducting arrangement, each ducting pipe 9 is not housed within a vent chase but instead is housed within the wall of the building or within a standard sized fireplace area 2. For each fireplace 2, duct sealing apparatus 12 according to the present invention is fitted into the ducting pipe 9 ventilating the fireplace at the point that the pipe intersects with the ceiling of the apartment containing the fireplace. At higher levels, the intersection of ducting pipe 9 with a ceiling is sealed with sealing means in the form of a fireproof gasket 14 illustrated in FIG. 4. This arrangement ensures that each dwelling area of an apartment is a sealable unit and that any fire that breaks out is confined to the apartment in which the fire started.

This is accomplished by virtue of the fact that each duct sealing apparatus acts to seal the ducting vent in the event of a very high temperature (indicative of a fire) being detected within an apartment. Any ducting pipe extending through the apartment and ventilating other lower fireplaces is sealed by fireproof gasket 14. Therefore, the duct sealing apparatus of the present invention in combination with the ducting arrangement illustrated incorporating gasket 14 ensures that the each apartment is a self-contained unit that will be automatically sealed in the event of a fire to prevent or at least hinder spreading of the fire beyond a single apartment.

As illustrated in FIG. 4, fireproof gasket 14 comprises a fireproof material, for example, a material sold under the trademark "Fibrefrax", sandwiched between a pair of rigid annular plates 15 attached to the ceiling of an apartment.

Duct sealing apparatus 12 is connected to fireplace 2 by conventional piping and elbows or preferably using insulated flexible piping. Above duct sealing apparatus 12 standard B vent ducting can be used to connect the duct sealing apparatus to atmosphere. In fact, the duct sealing apparatus can act as a support for the column of B vent ducting extending above it to atmosphere.

This novel ducting arrangement provides significant space savings as illustrated in FIG. 3 which shows a section view of a fireplace taken along line 3—3 of FIG. 2. Each apartment can have an identical small footprint fireplace and the ducting pipes 9 for lower fireplaces can be conveniently arranged and housed within a much smaller area than with present ducting systems using individual vent chases.

The ducting sealing apparatus 12 of the present invention with its ability to seal the ducting pipe in the event of a fire renders the material and space consuming vent chases of the prior art unnecessary. The structure and functioning of the duct sealing apparatus 12 are explained below and illustrated in FIGS. 5 and 6.

The duct sealing apparatus 12 comprises an enclosed body 18 having inlet and outlet passages 19 and 20, respectively, communicating with the duct piping to which the apparatus is connected. Preferably, enclosed body 18 is housed within an outer enclosure 23 dimensioned to provide an air space about body 18 as best illustrated in FIG. 6. Outer enclosure 23 has its own inlet passage 25 and outlet passage 26 adapted to receive inlet passage 19 and outlet passage 20 of enclosed body 18. As shown by dashed lines, ducting pipe 9 is connected to the inlet and outlet passages of the enclosed body 18 in the annular region 29 where the passages of the enclosed body and the outer enclosure overlap. Annular region 29 is adapted to accept the layer of insulation which cover "B vent" ducting pipe.

Outer enclosure inlet passage 25 and outlet passage 26 support and locate enclosed body 18 within the interior of outer enclosure 23.

The outer enclosure is also preferably formed with mounting brackets 30 to permit attachment of the outer surface to a surface such as the ceiling of an apartment.

Both enclosed body 18 and outer enclosure 23 are desirably of riveted sheet metal construction.

Enclosed body 18 houses duct sealing means in the form of a pivotable plate 22 movable between an open position to permit flow through the enclosed body and a closed position to block one of the passages of the enclosed body to prevent flow through the body. In the illustrated embodiment, plate 22 is shown in the open position. Plate 22 is mounted to pivotable axis 24 and can pivot to the closed position 27 shown in dashed lines in FIGS. 5 and 6 to block outlet passage 20. When plate 22 is in the open position, there is a straight path through the apparatus that permits unrestricted flow of gases through the unit for efficient ventilation.

Preferably, plate 22 is formed with a raised conical portion adapted to seat within outlet passage 20 when the plate is moved to the closed position to improve the seal over the passage.

To ensure that plate 22 remains closed once moved to the closed position, there are latch means comprising a clip formed from a resilient material mounted to a wall of enclosed body 18 adjacent an edge of plate 22. The clip is adapted to permit movement of plate 22 past the clip as the plate moves from the open position to the closed position as indicated by arrow 34 in FIG. 6. Once the plate moves past clip 32, the clip engages the edge of the plate and prevents movement of the plate from closed position 27.

There are actuating means for moving pivotable plate 22 from the open position to the closed position. The actuating means are controlled and activated by sensing means that, in the present circumstances, detect when the temperature in an apartment rises above a certain level, such as 100° C., indicating the probable presence of a fire in an apartment.

In the present embodiment, the actuating means comprise biasing means in the form of spring 36 to move the plate from the open position to the closed position and securing means to hold plate 22 in the open position against the force of spring 36 tending to move the plate to closed position 27. Spring 36 extends between the plate 22 and a fixed location on the enclosed body such as flange 38 extending inwardly from the wall of outlet passage 20. Spring 36 is under tension when plate 22 is in the open position resulting in the spring exerting a force tending to move the plate to closed position 27 against the opposite force of the securing means holding the plate in the open position.

The securing means includes an elongate member 40 attached to plate 22 by one end and the other end protrudes through a pair of aligned slots 41 and 42 formed in enclosed body 18 and outer enclosure 23. An aperture 44 is formed through the protruding end of elongate member 40. There is a fixed bracket 46 mounted to the exterior of outer enclosure 23 adjacent the protruding end of member 40. Bracket 46 slidably supports a locking pin 48 that is movable between a locked position as shown in FIGS. 5 and 6 in which the pin is inserted through aperture 44 to secure elongate member 40 in place with respect to the fixed bracket and a released position in which locking pin 48 is removed from aperture 44 to release elongate member 40 and permit movement of plate 22 to closed position 27. Pin 48 is provided with an attached base 49 and a spring 50 extends about the pin between the lower side 53 of bracket 46 and base 49 tending to bias the pin to the released position in the direction of arrow 52.

Sensing means in the form of a frangible link 54 acts to secure locking pin 48 in the locked position against the force of the spring 50. A pair of hooks 55 extend between lower bracket side 53 and pin base 49. These hooks engage in apertures formed in link 54 to secure pin 48 in the locked position. Link 54 is preferably a conventional fuse element adapted to break when the temperature rises above a predetermined level thereby permitting spring 50 to move locking pin 48 from the locked position to the released position. This action results in elongate member 40 being released so that plate 22 is quickly and positively moved to closed position 27 by spring 36 to close outlet passage 26.

Although the present invention has been described in some detail by way of example for purposes of clarity and understanding, it will be apparent that certain changes and modifications may be practised within the scope of the appended claims.

I claim:

1. Apparatus for sealing a duct comprising:
   an enclosed body having inlet and outlet passages for communicating the interior of the enclosed body with the duct;
   an outer enclosure about the enclosed body to define an air space about the body, the outer enclosure having an inlet passage and an outlet passage to permit communication of the inlet and outlet passages of the enclosed body with the duct;
   duct sealing means located within the enclosed body and movable between an open position to permit flow through the enclosed body and a closed position to block one of the passages of the enclosed body to prevent flow through the body;
   actuating means for moving the duct sealing means from the open position to the closed position; and
   heat sensing means for detecting elevated temperatures indicative of a fire and activating the actuating means.

2. Apparatus as claimed in claim 1 in which the outer enclosure inlet and outlet passages support and locate the enclosed body within the interior of the outer enclosure.

3. Apparatus as claimed in claim 1 in which the outer enclosure is formed with mounting brackets.

4. Apparatus as claimed in claim 1 in which the duct sealing means comprises:
   a plate pivotally mounted within the enclosed body for movement between the open position and closed position.

5. Apparatus as claimed in claim 4 in which the plate is formed with a raised portion adapted to seat within the passage the plate covers when moved to the closed position to improve the seal over the passage.

6. Apparatus as claimed in claim 4 in which the plate is positioned to cover the outlet passage of the enclosed body when moved to the closed position.

7. Apparatus as claimed in claim 4 including latch means to secure the plate into the closed position.

8. Apparatus as claimed in claim 7 in which the latch means comprises a clip adapted to permit movement of the plate past the clip as the plate moves from the open position to the closed position and prevent movement of the plate from the closed position by engaging the edge of the plate.

9. Apparatus as claimed in claim 4 in which the actuating means comprises:
   biasing means to move the plate from the open position to the closed position;
   securing means to secure the plate in the open position until the sensing means permit release of the plate.

10. Apparatus as claimed in claim 9 in which the biasing means comprises a resilient spring extending between the plate and an fixed location on the enclosed body such that the spring is under tension when the plate is in the open position resulting in the spring exerting a force tending to move the plate to the closed position against the opposite force of the securing means.

11. Apparatus as claimed in claim 10 in which the fixed location for attachment of the spring is a flange within the outlet passage of the enclosed body.

12. Apparatus as claimed in claim 9 in which the securing means comprises:
    an elongate member attached to the plate by one end and the other end extending through the enclosed body with an aperture formed through the member adjacent the other end;
    a fixed bracket;
    a locking pin slidably supported by the fixed bracket and movable between a locked position in which the pin is inserted through the aperture to secure the elongate member in place thereby holding the plate in the open position and a released position in which the locking pin is removed from the aperture to release the elongate member and per, nit movement of the plate to the closed position;
    a resilient spring associated with the locking pin tending to bias the pin to the released position;
    the sensing means acting to secure the locking pin in the locked position against the force of the spring.

13. Apparatus as claimed in claim 12 in which the sensing means comprises a frangible link adapted to break when the temperature rises above a predetermined level thereby permitting the spring to move the locking pin from the locked position to the released position.

14. A ducting system with ducting pipe for ventilating an enclosed space and apparatus for sealing the ducting pipe, said ducting system comprising;
    an enclosed body having inlet and outlet passages for communicating the interior of the enclosed body with the ducting pipe;
    an outer enclosure about the enclosed body to define an air space about the body, the outer enclosure having an inlet passage and an outlet passage to permit communication of the inlet and outlet passages of the enclosed body with the ducting pipe;
    duct sealing means located within the enclosed body and movable between an open position to permit flow through the enclosed body and a closed position to block one of the passages of the enclosed body to prevent flow through the body and through the ducting pipe;
    actuating means for moving the duct sealing means from the open position tot he closed position; and
    heat sensing means for detecting elevated temperatures indicative of a fire and activating the actuating means.

15. A ducting system as claimed in claim 14 in which the ducting pipe is connected to a heating appliance and the enclosed space is a dwelling area including a floor and a ceiling, the ducting pipe carrying gases from the heating appliance to the atmosphere through the ceiling of the dwelling area.

16. A ducting system as claimed in claim 15 in which the apparatus is installed in the ceiling of the dwelling area.

17. A ducting system as claimed in claim 15 in which there is a plurality of stacked dwelling areas in which the ceiling of a lower dwelling area is the floor of an adjacent upper dwelling area, each dwelling area having a heating appliance and a separate ducting pipe extending to atmosphere through upper dwelling areas comprising a first length of pipe connecting the heating appliance to the apparatus mounted in the ceiling of the dwelling to permit sealing of the dwelling area, a second length of pipe connecting the apparatus to atmosphere and a plurality of sealing means to seal the second length of pipe whenever the pipe passes through an upper dwelling area.

18. A ducting system as claimed in claim 17 in which the sealing means comprises a fireproof gasket.

* * * * *